(12) United States Patent
Pytlarz et al.

(10) Patent No.: US 11,468,547 B2
(45) Date of Patent: Oct. 11, 2022

(54) SYSTEMS AND METHODS FOR ADJUSTING VIDEO PROCESSING CURVES FOR HIGH DYNAMIC RANGE IMAGES

(71) Applicant: Dolby Laboratories Licensing Corporation, San Francisco, CA (US)

(72) Inventors: Jaclyn Anne Pytlarz, Sunnyvale, CA (US); Robin Atkins, San Jose, CA (US)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 0 days.

(21) Appl. No.: 16/461,779

(22) PCT Filed: Dec. 7, 2017

(86) PCT No.: PCT/US2017/065114
§ 371 (c)(1),
(2) Date: May 16, 2019

(87) PCT Pub. No.: WO2018/111682
PCT Pub. Date: Jun. 21, 2018

(65) Prior Publication Data
US 2019/0362476 A1 Nov. 28, 2019

Related U.S. Application Data

(60) Provisional application No. 62/432,912, filed on Dec. 12, 2016.

(30) Foreign Application Priority Data

Jan. 20, 2017 (EP) .................................. 17152419

(51) Int. Cl.
G06T 5/00 (2006.01)

(52) U.S. Cl.
CPC .... *G06T 5/009* (2013.01); *G06T 2207/10016* (2013.01); *G06T 2207/20208* (2013.01)

(58) Field of Classification Search
CPC . G06T 5/009; G06T 5/40; G09G 5/10; G09G 5/02; G09G 3/2003; H04N 19/52;
(Continued)

(56) References Cited

U.S. PATENT DOCUMENTS 5,668,890 A * 9/1997 Winkelman ......... H04N 1/4074
345/604
7,352,410 B2 4/2008 Chou
(Continued)

FOREIGN PATENT DOCUMENTS

JP 0997319 4/1997
JP 2003280629 10/2003
(Continued)

OTHER PUBLICATIONS

ITU-R BT.1886 "Reference Electro-Optical Transfer Function for Flat Panel Displays Used in HDTV Studio Production" Mar. 2011.
(Continued)

*Primary Examiner* — Paulos M Natnael

(57) ABSTRACT

Systems and methods for adjusting video processing curves are disclosed herein. In one embodiment a method for applying an adjustment to an original curve derived from a set of input image data is disclosed, comprising: receiving a set of input image data to be adjusted; calculating an original curve from the set of input image data; receiving an adjustment curve, the adjustment curve based upon a desired image parameter; and applying the adjustment curve to the original curve to produce a resulting curve. In another embodiment, a display management unit (DMU) comprising a processor is disclosed that, upon receiving a set of input image data, processes the original curve according to: cal-
(Continued)

culating an original curve from the set of input image data; receiving an adjustment curve, the adjustment curve based upon a desired image parameter; and applying the adjustment curve to the original curve to produce a resulting curve.

13 Claims, 7 Drawing Sheets

(58) Field of Classification Search
CPC ...... H04N 19/176; H04N 19/182; H04N 5/10; H04N 5/235; H04N 5/262
USPC ............... 348/362, 673, 674, 672, 575, 453; 345/102, 690, 589, 207; 382/167, 168, 382/171
See application file for complete search history.

(56) References Cited

U.S. PATENT DOCUMENTS

| | | | |
|---|---|---|---|
| 7,421,120 B2* | 9/2008 | Kang | G06T 5/40 358/1.9 |
| 7,450,753 B2* | 11/2008 | Hayaishi | H04N 1/6077 348/E9.052 |
| 7,688,294 B2* | 3/2010 | Baik | G06T 5/008 345/690 |
| 7,894,000 B2 | 2/2011 | Gutta | |
| 8,044,978 B2* | 10/2011 | Na | G06T 5/009 345/690 |
| 8,462,171 B2* | 6/2013 | Hinkel | H04N 9/68 345/589 |
| 8,531,379 B2 | 9/2013 | Kerofsky | |
| 8,704,859 B2 | 4/2014 | Greenebaum | |
| 8,958,638 B2* | 2/2015 | Webb | G06T 5/007 382/167 |
| 9,105,217 B2 | 8/2015 | Demos | |
| 9,236,033 B2 | 1/2016 | Manabe | |
| 10,600,166 B2* | 3/2020 | Pytlarz | G06T 5/009 |
| 2004/0213457 A1 | 10/2004 | Mori | |
| 2004/0258308 A1* | 12/2004 | Sadovsky | H04N 1/32128 382/190 |
| 2006/0176407 A1* | 8/2006 | Ikeda | H04N 5/202 348/674 |
| 2006/0267923 A1* | 11/2006 | Kerofsky | G09G 3/22 345/102 |
| 2007/0285576 A1* | 12/2007 | Moore | G09G 3/20 348/674 |
| 2008/0284721 A1* | 11/2008 | Hasegawa | G09G 3/3406 345/102 |
| 2011/0199536 A1* | 8/2011 | Wolf | G06T 3/0012 348/441 |
| 2013/0076974 A1 | 3/2013 | Atkins | |
| 2013/0215133 A1 | 8/2013 | Gould | |
| 2014/0132618 A1* | 5/2014 | Su | G09G 5/02 345/589 |
| 2014/0232709 A1 | 8/2014 | Dunn | |
| 2015/0070402 A1 | 3/2015 | Shah | |
| 2015/0077440 A1 | 3/2015 | Lee | |
| 2015/0245050 A1 | 8/2015 | Tourapis | |
| 2016/0140889 A1 | 5/2016 | Wu | |
| 2018/0108169 A1* | 4/2018 | Miller | G06T 15/08 |
| 2020/0005441 A1* | 1/2020 | Pytlarz | G06T 5/009 |
| 2020/0219238 A1* | 7/2020 | Peng | G06T 5/007 |

FOREIGN PATENT DOCUMENTS

| | | |
|---|---|---|
| JP | 2004310671 | 11/2004 |
| JP | 2011045009 | 3/2011 |
| JP | 2012507791 | 3/2012 |
| JP | 2016081427 | 5/2016 |

OTHER PUBLICATIONS

SMPTE ST 2084:2014 "High Dynamic Range EOTF of Mastering Reference Displays".
Rempel, A. et al "Video Viewing Preferences for HDR Displays Under Varying Ambient Illumination" Proc. of the 6th Symposium on Applied Perception in Graphics and Visualization ACM, 2009.
Krawczyk, G. et al "Brightness Adjustment for HDR and Tone Mapped Images" 15th Pacific Conference on Computer Graphics and Applications, Oct.-Nov. 2007, pp. 373-381.
Mantiuk, R. et al "Display Adaptive Tone Mapping" School of Electrical Engineering and Computer Science ACM Transactions on Graphics, vol. 27, No. 3, 2008.
Pouli, T. et al. "Color Correction for Tone Reproduction" Color and Imaging Conference, Nov. 1, 2013, pp. 215-220.
Mantiuk, R. et al "Display Adaptive Tone Mapping" ACM Transactions on Graphics, Aug. 1, 2008, pp. 68.
ITU-R BT.2100 "Image Parameter Values for High Dynamic Range Television for Use in Production and International Programme Exchange" ITU, Jul. 2016.

* cited by examiner

SYSTEMS AND METHODS FOR ADJUSTING VIDEO PROCESSING CURVES FOR HIGH DYNAMIC RANGE IMAGES

CROSS-REFERENCE TO RELATED APPLICATIONS

This application claims the benefit of priority to European Patent Application No. 17152419.2, filed Jan. 20, 2017, and U.S. Provisional Patent Application No. 62/432,912, filed Dec. 12, 2016, both of which are incorporated herein by reference in their entirety.

TECHNICAL FIELD

The present invention relates to High Dynamic Range Displays (HDR), and more particularly to HDR displays using dual modulation.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

HDR displays and the technology behind them are marketed as DOLBY VISION™ by Dolby Laboratories Licensing Corporation., related to the assignee of the present invention. HDR displays, now being constructed, may use a backlight comprising modulated light sources such as modulated LEDs. Such backlights are sometimes called IMLED (Individually Modulated Array of LED) backlights. In one version, the brightness of each LED is controlled by an 8-bit signal, so each LED has 256 brightness steps. Rather than having a single light source behind an LCD screen, a plurality of small regions are backlit in a modulated manner according to the local brightness and contrast in the scene being shown.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (03/2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m2 or nits. Most consumer HDTVs range from 300 to 500 nits with new models reaching 1000 nits (cd/m2). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY

Systems and methods for adjusting video processing curves are disclosed herein. In one embodiment, a method for applying an adjustment to an original curve derived from a set of input image data is disclosed, comprising: receiving a set of input image data to be adjusted; calculating an original curve from the set of input image data; receiving an adjustment curve, the adjustment curve based upon a desired image parameter; and applying the adjustment curve to the original curve to produce a resulting curve.

In another embodiment, a display management unit (DMU) comprising a processor is disclosed that, upon receiving a set of input image data, processes the original curve according to: calculating an original curve from the set of input image data; receiving an adjustment curve, the adjustment curve based upon a desired image parameter; and applying the adjustment curve to the original curve to produce a resulting curve.

The original curve may be a luminance mapping or chrominance mapping curve, i.e. instructions for mapping the image data to luma or chroma values for rendering a final image on a display device. The adjustment curve (which may be represented by a lookup-table featuring multiple values) may be based on a scaling factor representing an ambient illumination of a viewing environment and/or user preferences such that the original curve may represent the default mapping parameters that would be applied if neither ambient illumination nor user preferences were available.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EXAMPLE EMBODIMENTS

Various video processing adjustments are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example Video Delivery Processing Pipeline

Many example embodiments described herein relate to the adjustment of video curves according to several conditions—e.g., (including, but not limited to) ambient correction, user preference settings or the like. Such adjustments may be performed to one or more of the following parameters—tone, saturation, brightness, among others. These adjustments may be performed at various points in the image pipeline delivery—e.g., during display management or the like.

Figure 1:
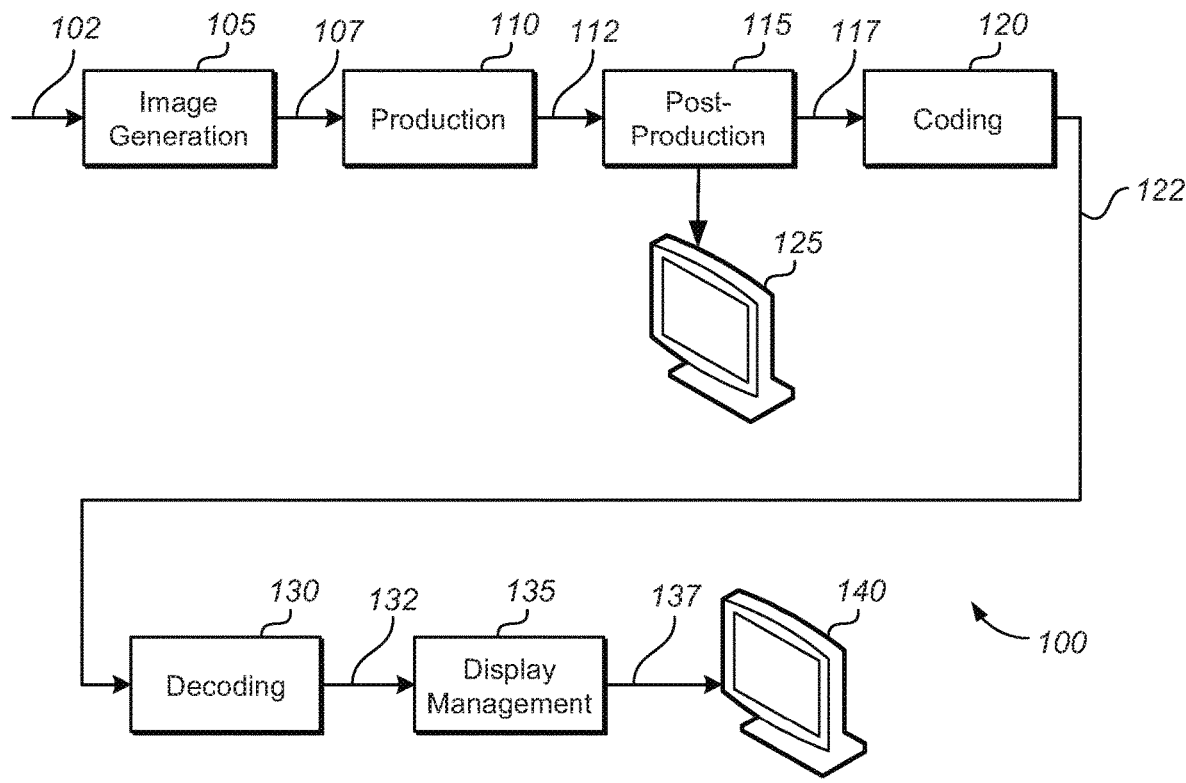
FIG. 1 depicts an example process for a video delivery pipeline.

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management unit (DMU) (135) may be used to map the dynamic range of decoded signal (132) to the characteristics of the target display (140) by generating display-mapped signal (137).

As mentioned above, there may be several points in this video pipeline where adjustment curves are applied to the video data—including display management unit (135). It will be appreciated that the display management unit may be implemented external to the display or internal to the display system and that the scope of the present application encompasses these various embodiments. In one embodiment, the DMU may comprise a processor and a computer readable memory, executing image processing algorithms as described herein—e.g., in the form of a set-top box, codec as is well known in the art.

Overview of Video Adjustments

In many embodiments of the present application, both systems and methods are disclosed to adjust various video curves according to tone, saturation, brightness and the like. The adjustments may be either accomplished automatically—or according to user preference and input. For just a few examples, ambient corrections may be made to the video curves due to increased room illumination, screen reflectance—as well as for user preference adjustments to change, e.g., the average pixel luminance of an image, or to alter saturation.

Figure 2:
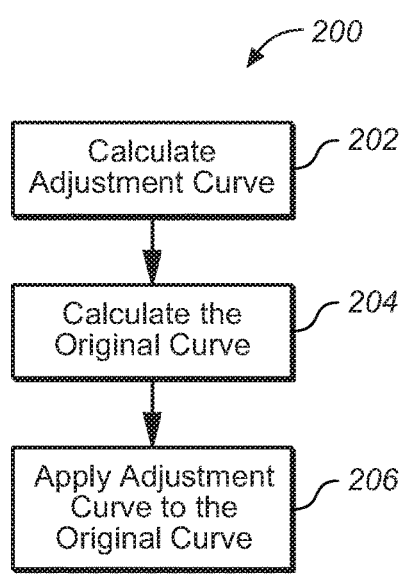
FIG. 2 depicts one embodiment of an application of an adjustment curve to an original curve.

FIG. 2 is one embodiment of an application of adjusting an original image curve according to some adjustment parameter. In one embodiment, this adjustment method may be executed as an adjustment module in a DMU at some point in the video pipeline. Method (200) calculates one or more adjustment curves (202) and calculates the original curve (204) and applies the adjustment curve to the original curve (206). In several embodiments, an original curve may be derived from a number of sources—e.g., an image, a frame of video data, a scene in a video (e.g., multiple consecutive frames of video data) or the like. Also, an original curve may be the processing that would happen irrespective of any adjustment curve. In one embodiment, this original curve may be the display curve designed to tone map an image from one display to another. This original curve may be input and/or otherwise received by a suitable module and/or processing component in the video pipeline. It will also be appreciated that, while the present application talks of "original curve", the "original curve" may also be presented as a sequence of numbers to the suitable module for further processing—and may or may not literally be a curve.

Figure 3:
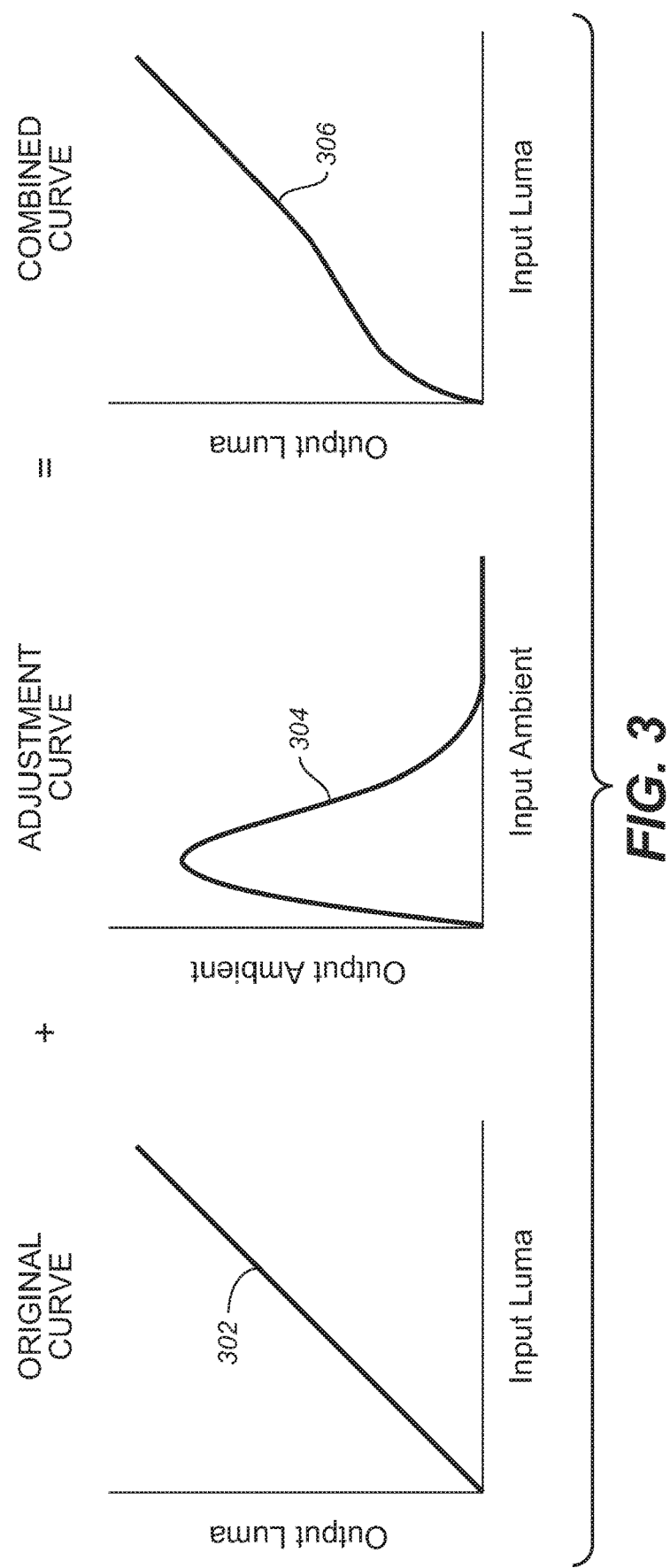
FIG. 3 depicts one example of the application of the adjustment module of FIG. 2.

FIG. 3 depicts one example of the application of the adjustment module of FIG. 2. As is shown, the original data is calculated as curve 302 and an adjustment curve is calculated as curve 304. The resulting, combined curve is shown as curve 306. The original curve may be calculated according to one or more parameters—e.g., saturation, tone mapping, 1:1 mapping and the like. As with the "original curve" mentioned above, the adjustment curve may be received, derived and/or calculated from one or more image parameters (e.g., brightness, saturation, contrast or the like) and may or may not literally be presented as a curve (e.g., the adjustment curve may be presented as a derived sequence of numbers to a suitable module). The adjustment curve may be applied to additionally process the image beyond the parameters specified in the "original curve". In one embodiment, this curve allows for a user preference such as increased saturation to be applied during tone mapping (tone mapping is the "original curve"). This tends to increase efficiency and color accuracy. The application of adjustment curve to an original curve may be performed by one or more of the linear or nonlinear operations (e.g., addition, subtraction, multiplication, division, convolution etc.). In one embodiment, it is desirable to ensure that the resulting, combined curve 306 should substantially be a monotonic function—otherwise, it may be possible to produce some odd visual effect. It will be appreciated that the resulting curve may be presented by the suitable module, DMU or the like to the display for final rendering of an image. As with the "original curves" and "adjustment curves" above, the final resulting curve may or may not literally be a curve—but presented as a derived sequence of numbers to a suitable module, DMU, or display for final rendering.

It should be appreciated that one main benefit of implementing a single resulting curve is efficiency and ease of adjustment. In one embodiment, it is possible to employ an interchangeable function that is added to a tone or saturation mapping curve—making modifications simpler. In another embodiment, the curve may also be implemented as a one-dimensional look-up table for speed and efficient. Such an implementation would be efficient because the adjustment curves may be tuned/tweaked to meet customer requirements, without requiring major changes to the overall algorithm.

It should also be appreciated that the application of adjustment may occur at various parts of a system and method and need not necessarily follow in any order as a step in a method. For merely some examples, the adjustment curve could be applied to the input image, as follows:
- the adjustment curve may also be applied to the input parameters;
- the adjusted input parameters may be used to calculate an adjusted original curve;
- the adjusted original curve may be applied to the adjustment curve; and the adjusted adjustment curve may be applied to the input image.

These various adjustments may occur in any suitable order without departing from the scope of the present application. In addition, adjustments may also be made to the metadata at some point in the processing.

Embodiment for Applying Ambient Correction

It will now be described several embodiments of applying ambient corrections/adjustments to an original curve. In one embodiment, as a surround luminance of a display increases, the image should be adjusted if the relative appearance is to remain consistent. In this embodiment, the image adjustment may be applied using a one-dimensional function, e.g., where the single variable is the surround luminance of the display. Such a one-dimensional function may be calculated first, and a scalar is applied. The Table 1 is one embodiment

TABLE 1

AMBIENT CORRECTION METHOD

Step 1: Calculate the adjustment curve:
Let:
  A = Input pixel value scaled 0-1 (encoded with the ST 2084 non-linearity).
  L = Assumed original adapting luminance.
  f(x) = ST 2084 EOTF (or some other EOTF).
  S = Scaling factor based on ambient illumination.
  C = Adjustment curve to add to original curve
Then, calculate B and C as follows:

$$B = \frac{A - Ae^{-\frac{ln2\left(\frac{f(A)+L}{f(A)}2^{0.25}\right)-ln^2(2^{0.25})}{2ln^2(32)}}}{2}$$

$$C = \frac{SB}{100 \max(B)}$$

A typical value for L (original adapting luminance) may be 5 cd/m2. Typical scaling factor values range from 0-10 and should be correlated with ambient illumination which may be derived from sensor data or theoretically based on user preference. B may also comprise a Barton contrast sensitivity function in some embodiments.

Step 2: Calculate the Original Curve
The original curve may be defined by previous mapping or tone curves applied to an image. If no previous mapping or curve is available, or if none is desired, a 1:1 curve may be used as the original curve.
Let: A=Input pixel value scaled 0-1 (encoded with the ST 2084 non-linearity).
  D=Original curve, then
  D=A
Step 3: Apply (add) the adjustment curve to the original curve
Let: A=Input pixel value scaled 0-1 (encoded with the ST 2084 non-linearity).
  E=Output pixel value scaled 0-1 (encoded with the ST 2084 non-linearity), then E=D+C
The actual values used for L and S may change based on user preference, display capabilities, or ambient illumination. These equations may also be altered to apply various ambient correction look-up-tables in a similar fashion.

Various Adjustment Curves Embodiments

It will now be described several embodiments of implementing various adjustment curves according to some parameter. Many embodiments may be variations of the general embodiment of FIG. 2—e.g., the adjustment curve is altered compared to the ambient correction adjustment curve.

For example, one embodiment of a saturation adjustment curve may be applied/changed based on user preference. The adjustment curve may be applied to any form of saturation component (e.g., RGB independently or a chroma component $C_T C_P$ of $IC_T C_P$). For example, in a display management algorithm, the saturation of each pixel may be modified according to its intensity using the following equation (e.g., as in the method noted in FIG. 2 and as may be substituted in Table 1 above):

$f_s(x)$=SaturationScaleFunction $C'_T = C_T \times f_S(I)$ $C'_P = C_P \times f_S(I)$ Where $C_T$ and $C_P$ are the chroma components of the source image, and $C'_T$ and $C'_P$ are the chroma components of the target image, in $IC_T C_P$ or IPT color space as described in Rec. ITU-R BT. 2100, *"Image parameter values for high dynamic range television for use in production and international programme exchange,"* July 2016, which is incorporated herein by reference.

In this embodiment, the SaturationScaleFunction(I) ($f_s(x)$) may be further modified by a user preference or ambient adjustment function, such that NewSaturationScaleFunction(I,j,k)=SaturationScale-
Function(I)+j*AmbientScaleFunction+
k*PreferenceScaleFunction, where j and k are scaling values based on a measure of the ambient environment and user preference respectively, and the AmbientScaleFunction and PreferenceScaleFunction are pre-determined or tuned curves as described herein.

Brightness Adjustment Curve Embodiments

For yet another embodiment of applying adjustment curves, the following discloses methods and systems for adjusting the brightness of original curves.

In one embodiment, it may be desired to change the average pixel luminance of a given image, scene or program. In such cases, a brightness adjustment curve may be employed. Such a curve may be modified to change the brightness of the image and may be applied to any form of brightness component (e.g., RGB independently or a luminance component such as I of $IC_T C_P$).

In one embodiment, the adjustment curve may be applied during the time that the DMU is applying a display tone mapping and may be applied directly to the original tone mapping curve. In addition, if image data is available, the minimum, mean and maximum of the image may be used to define a Gaussian-like function. One such embodiment might be performed as follows:

Let: x=Input pixel value scaled 0-1 (encoded with the ST 2084 non-linearity)
a=Change in brightness requested based on preference
b=mean
c=min(max−mean, mean−min), then $$f(x) = ae^{-\frac{(x-b)^2}{2c^2}}$$

where min, mean, and max values denote the minimum, average, and maximum luminance values in a frame or a scene, and the min(d1,d2) function outputs the minimum between variables d1 and d2.

In one embodiment, the variables a, b, and c may be altered independently based on user preference. The Gaussian curve may also be skewed based on the mean of the image so as to avoid brightening noise in an image.

Figure 4:
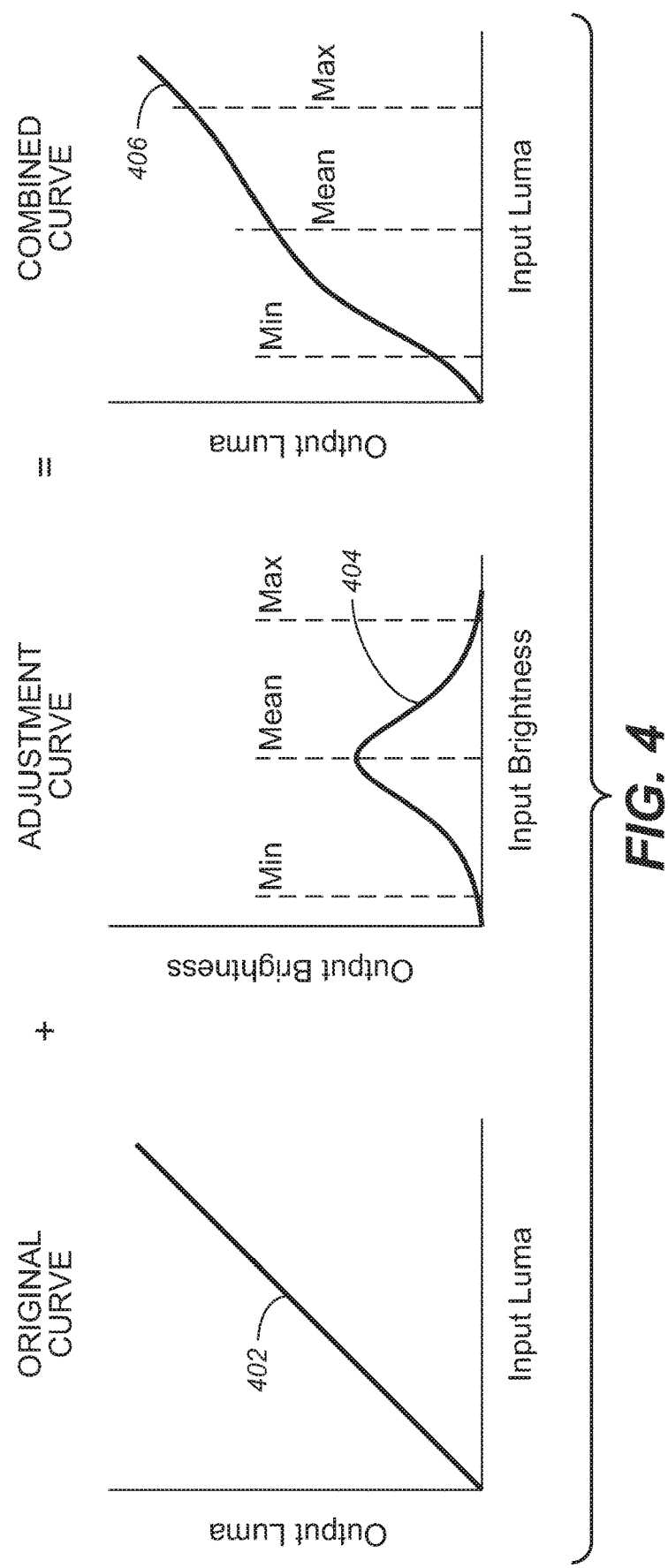
FIG. 4 depicts this embodiment of an application of a brightness adjustment curve to an original curve.

FIG. 4 depicts this embodiment—as original curve 402 is adjusted by curve 404, to produce a resulting, combined curve 406. It will be noted that the min, mean and max values are as shown in curve 404 and the resulting values as mapped in curve 406.

Contrast Adjustment Curve Embodiments

Just as with brightness and saturation preference adjustment above, it is also possible to consider contrast adjustment curves.

As with the other adjustments, the same processing concepts may apply—e.g., there is some original tone mapping and some contrast adjustment curve may be applied. It will be appreciated that a suitable contrast adjustment curve may be derived automatically (e.g., with ambient data, possibly recorded by a sensor), or may be user-supplied.

Figure 5:
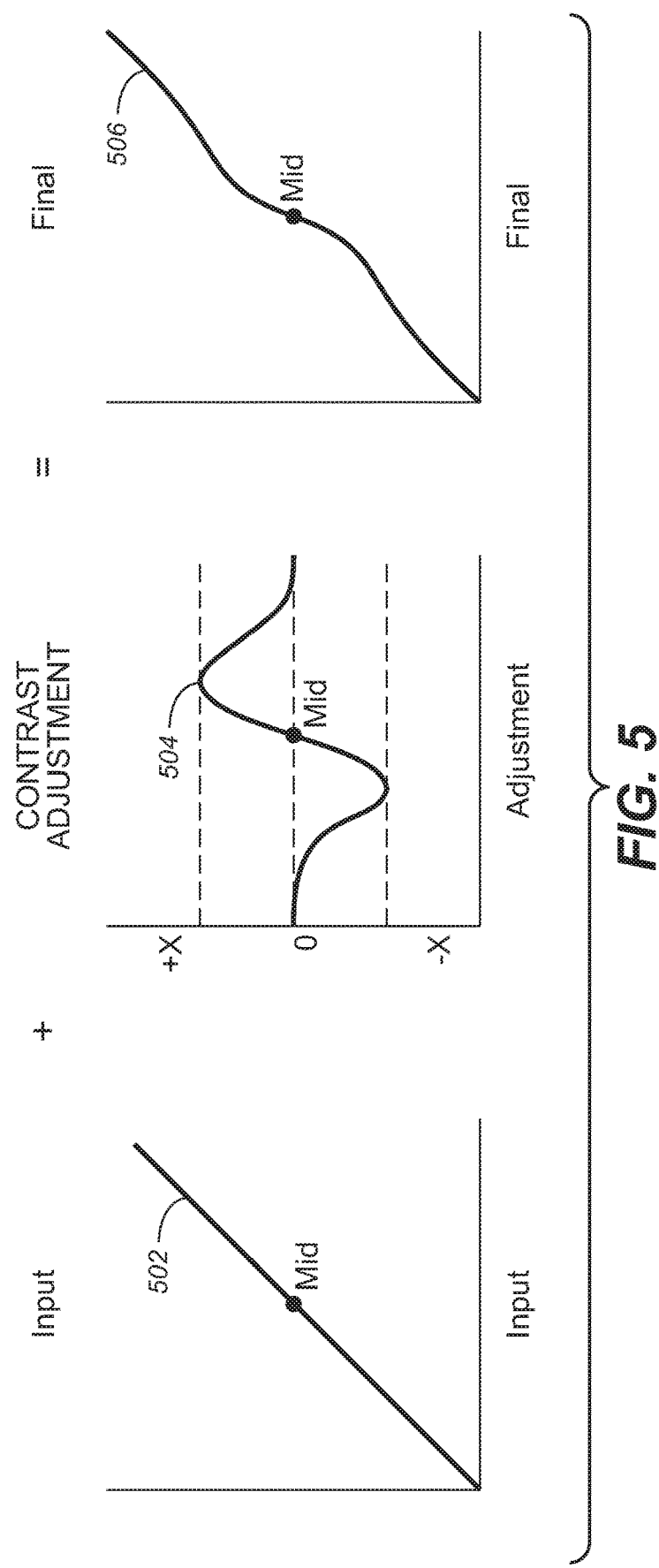
FIG. 5 depicts one embodiment of an application of a contrast adjustment curve to an original curve.
Figure 6:
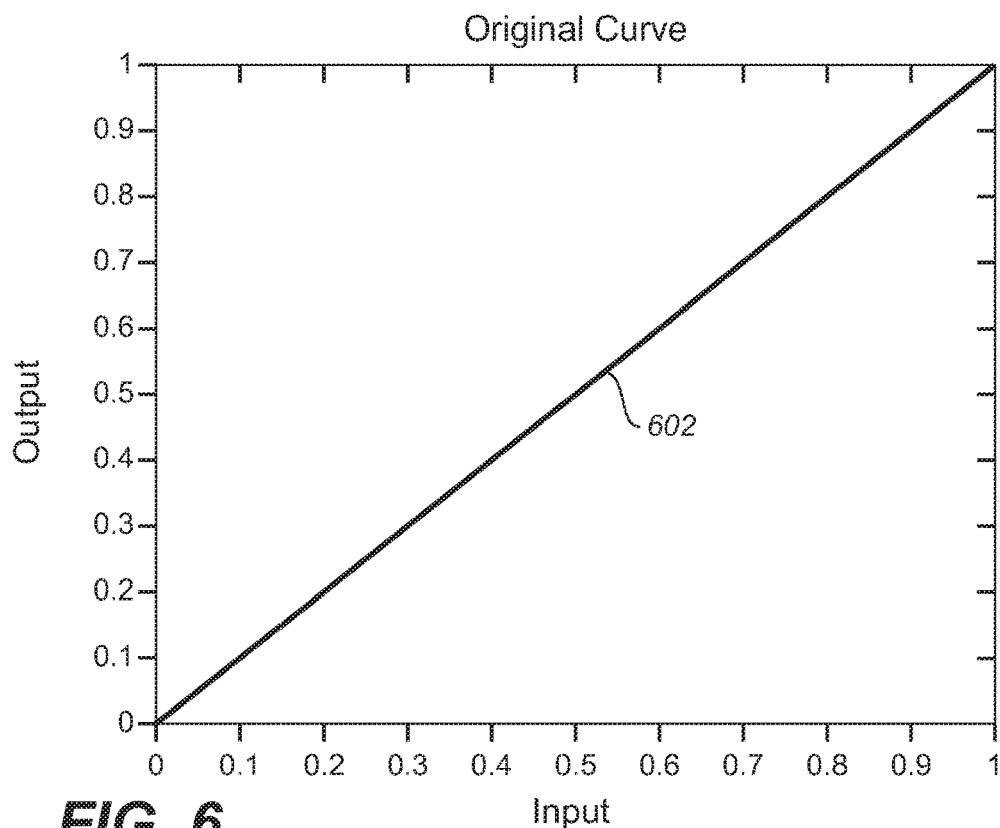
FIGS. 6 through 11 depict a number of adjustment processing examples that may be applied to an exemplary original curve.
Figure 7:
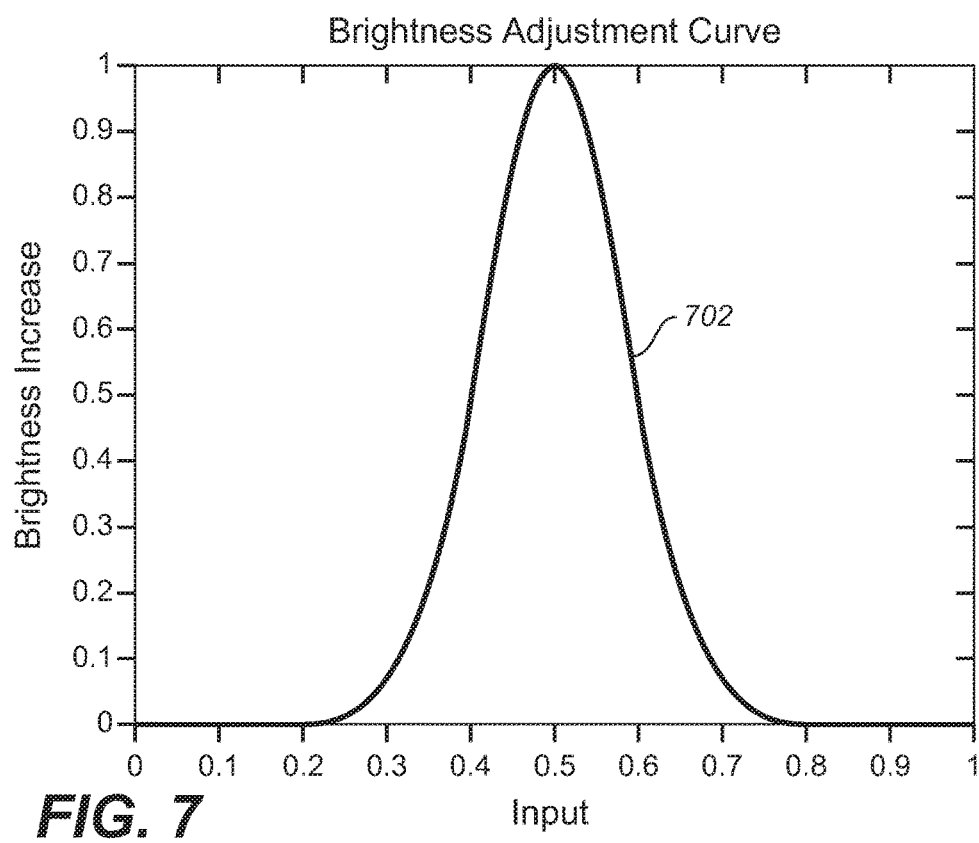
Figure 8:
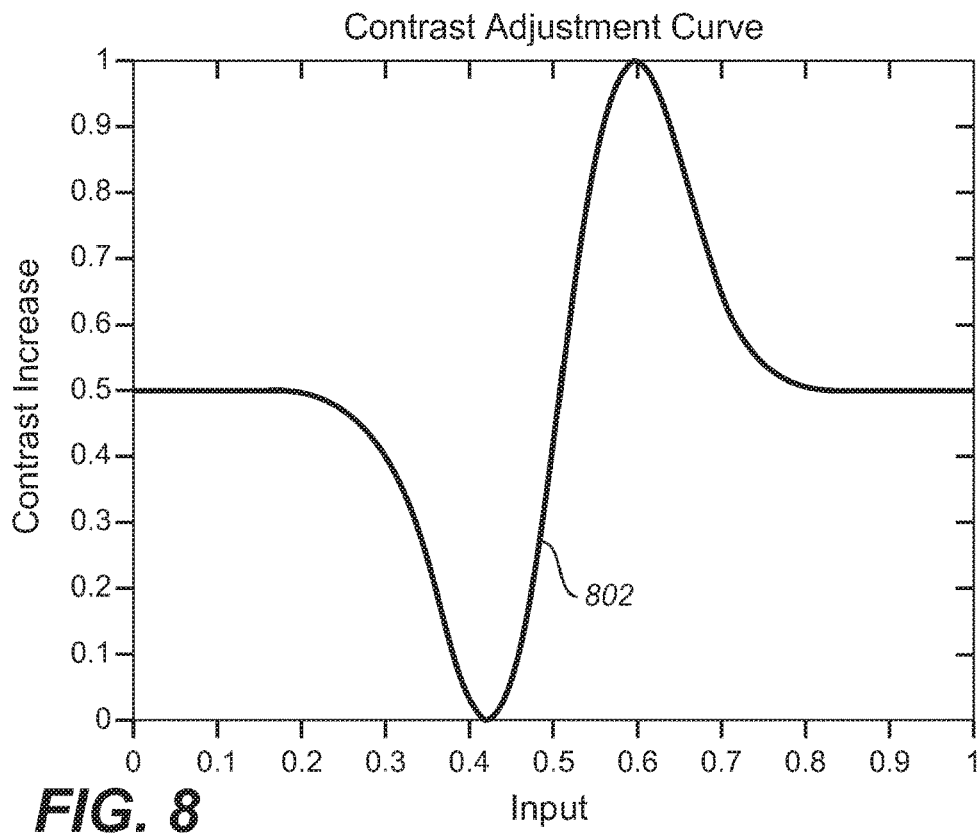
Figure 9:
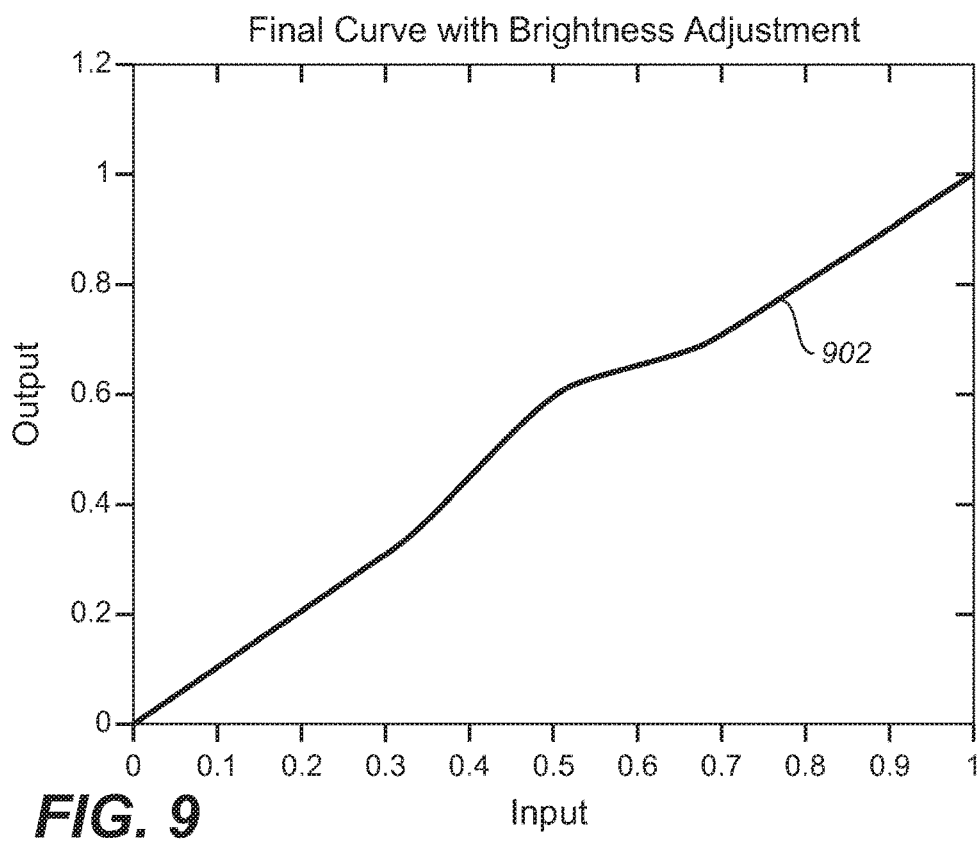
Figure 10:
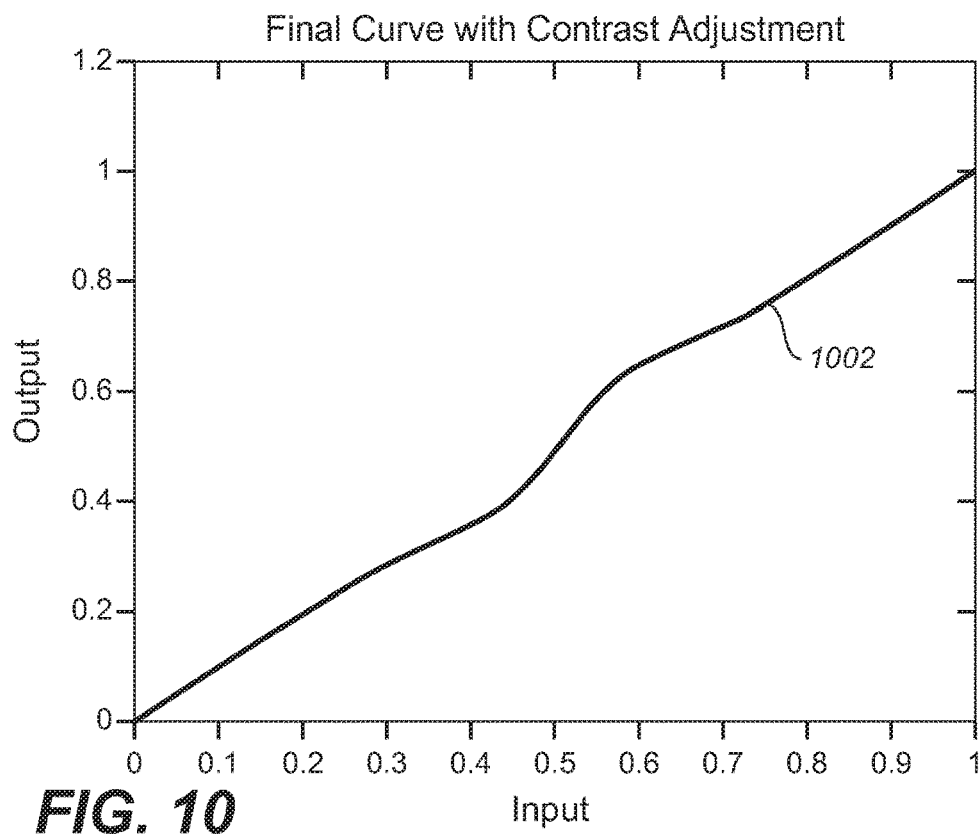
Figure 11:
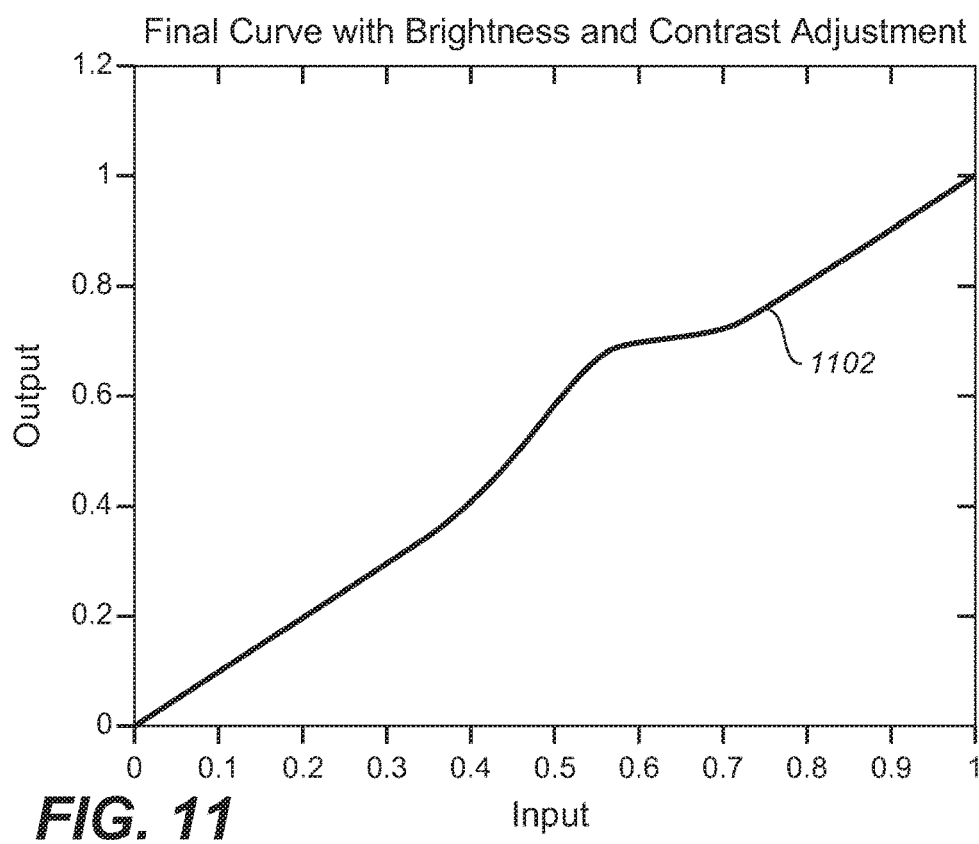

FIG. 5 depicts one embodiment of a contrast adjustment curve being applied to original curve 502. It should be appreciated that one difference between the brightness curve and the contrast curve 504 is that the contrast curve may look like the negative of the derivative of the brightness curve (e.g., the derivative of a Gaussian). In one embodiment, this may allow to increase the slope of the curve around the midpoint (as noted)—but without changing the brightness at the midpoint in resulting curve 506. Increasing the slope may increase the contrast in a way that doesn't affect the brightness. By selecting the width and center of the adjustment curve, it is possible to optimize the effect on the image.

A Few Processing Examples

FIGS. 6 through 11 depict a number of adjustment processing examples that may be applied to an exemplary original curve 602. It will be appreciated that although the original curve 602 (and other original curves depicted herein) may be shown as a 1:1 mapping, the original curve may assume may other forms and/or mappings.

Curves 702 and 802 depict exemplary brightness and contrast adjustment curves, respectively. Curves 902, 1002 and 1102 depict final curves, resulting from brightness adjustment, contrast adjustment and a combination of both brightness and contrast, respectively.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such soft are may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, calculating pixel/sub-pixel blurring of a local dimming panel, calculating color correction or characterizations, preparing image signals and applying them to driver and/or other electronics to energize backlights, panels, or other devices in a display, calculating luminance values, interpolating, averaging, or adjusting luminance based on any of the factors described herein, including a desired luminance for a pixel or region of an image to be displayed, and the display, storage, or communication of results according to the processes of the present invention.

The present invention may suitably comprise, consist of or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

Various aspects of the present invention may be appreciated from the following enumerated example embodiments (EEEs):

EEE 1. A method for applying an adjustment to an original curve derived from a set of input image data, comprising:
receiving a set of input image data to be adjusted;
calculating an original curve from the set of input image data;
receiving an adjustment curve, the adjustment curve based upon a desired image parameter; and
applying the adjustment curve to the original curve to produce a resulting curve.

EEE 2. The method according to EEE 1, wherein the set of input image data comprises one of an image, a frame of video data and a scene in a video.

EEE 3. The method according to EEE 1 or 2, wherein calculating an original curve from the set of input image data further comprises calculating original curve from one or more image parameters.

EEE 4. The method according to EEE 3, wherein one or more image parameters for calculating an original curve comprises one of a saturation parameter, tone mapping parameter and 1:1 mapping parameter.

EEE 5. The method according to any of the EEEs 1-4, wherein the desired image parameter upon which the adjustment curve is based comprises one of ambient parameter, saturation parameter, brightness parameter and a contrast parameter.

EEE 6. The method according to EEE 5, wherein applying the adjustment curve to the original curve comprises applying an operation to the original curve employing the adjustment curve.

EEE 7. The method according to EEE 6, wherein the operation comprises one of addition, subtraction, multiplying, dividing and convolving.

EEE 8. The method according to any of the EEEs 5-7, wherein the desired image parameter comprises an ambient parameter and the adjustment curve is calculated as:

$C = SB/100 \max(B)$ wherein S comprises a scaling factor based on ambient illumination and B is a function dependent on input pixel values, assumed original adapting luminance and a function based on EOTF.

EEE 9. The method according to any of the EEEs 5-7, wherein the desired image parameter comprises a saturation parameter and the adjustment curve is calculated as:

$f_s(x)$ = some Saturation Scale Function $C'_T = C_T \times f_S(I)$ $C'_P = C_P \times f_S(I)$ wherein $C_T$ and $C_P$ are the chroma components of the source image, and $C'_T$ and $C'_P$ are the chroma components of the target image and I is the luminance component.

EEE 10. The method according to EEE 9, wherein the Saturation Scale Function may be a function of one of ambient conditions and user preferences.

EEE 11. The method according to any of the EEEs 5-7, wherein the desired image parameter comprises a brightness parameter and the adjustment curve is calculated as:

$$f(x) = ae^{-\frac{(x-b)^2}{2c^2}}$$

wherein x comprises an input pixel value, a comprises a change in brightness requested based on preference, b comprises the mean and c comprises the min(max−mean, mean−min).

EEE 12. The method according to any of the EEEs 5-7, wherein the desired image parameter comprises a contrast parameter and the adjustment curve is calculated as negative of the derivative of the brightness curve.

EEE 13. The method according to any of the EEEs 1-12, wherein the method further comprises:
sending the resulting curve to a display for rendering a final image based on the resulting curve.

EEE 14. A display management unit (DMU) comprising a processor that, upon receiving a set of input image data, processes the original curve according to:

calculating an original curve from the set of input image data;
receiving an adjustment curve, the adjustment curve based upon a desired image parameter; and
applying the adjustment curve to the original curve to produce a resulting curve.

EEE 15. The DMU according to EEE 14, wherein the desired image parameter upon which the adjustment curve is based comprises one of ambient parameter, saturation parameter, brightness parameter and a contrast parameter.

EEE 16. The DMU according to EEE 15, wherein applying the adjustment curve to the original curve comprises applying an operation to the original curve employing the adjustment curve.

EEE 17. The DMU according to EEE 16, wherein the operation comprises one of addition, subtraction, multiplying, dividing and convolving.

EEE 18. The DMU according to any of the EEEs 14-17, wherein the DMU sends the resulting curve to a display for rendering a final image based on the resulting curve.

EEE 19. The DMU according to EEE 18, wherein the DMU is external to the display.

EEE 20. The DMU according to EEE 18, wherein the display comprises the DMU.

What is claimed is:

1. A method for applying an adjustment to an original luminance mapping curve or to an original chrominance mapping curve derived from a set of input image data, comprising:
   receiving a set of input image data to be adjusted;
   calculating an original luminance mapping curve and/or an original chrominance mapping curve from the set of input image data;
   receiving an adjustment curve, the adjustment curve being based upon a scaling factor representing an ambient illumination of a viewing environment and/or user preferences, wherein the user preferences comprise user preferences regarding one of saturation, brightness and contrast of a final image; and
   applying the adjustment curve to one original mapping curve to produce a resulting mapping curve used for rendering a final image based on the resulting mapping curve, wherein the adjsutment curve is calculated as:

$f_s(x)$=a Saturation Scale Function $C'_T = C_T \times f_S(I)$ $C'_P = C_P \times f_S(I)$ wherein $C_T$ and $C_P$ are chroma components of a source image, and $C'_T$ and $C'_P$ are chroma components of a target image and $I$ is a luminance component, wherein optionally the Saturation Scale Function may be a function of one of ambient conditions and the user preferences.

2. The method according to claim 1, wherein the set of input image data comprises one of an image, a frame of video data and a scene in a video to be displayed by a display device in the viewing environment, wherein the scene in the video comprises multiple consecutive frames of video data.

3. The method according to claim 1, wherein calculating the original luminance mapping curve from the set of input image data further comprises calculating the original luminance mapping curve from one or more tone mapping parameters.

4. The method according to claim 1, wherein calculating the original chrominance mapping curve from the set of input image data further comprises calculating the original chrominance mapping curve from one or more saturation mapping parameters.

5. The method according to claim 1, wherein applying the adjustment curve to one original curve comprises applying an operation to said original curve employing the adjustment curve, wherein optionally the operation comprises one of addition, subtraction, multiplying, dividing and convolving.

6. The method according to claim 1, wherein the adjustment curve is calculated as:

$$C = \frac{SB}{100 \, \max(B)}$$

wherein $S$ is the scaling factor representing the ambient illumination and $B$ is a function dependent on input pixel values, assumed original adapting luminance and a function based on an Electro-Optical Transfer Function, EOTF.

7. The method according to claim 1, wherein the adjustment curve is calculated as:

$$f(x) = ae^{-\frac{(x-b)^2}{2c^2}}$$

wherein $x$ comprises an input pixel value, $a$ comprises a change in brightness requested based on user preferences, $b$ comprises the mean and $c$ comprises the *min(max−mean, mean−min)* luminance values in an image, a frame of video data or a scene in a video, wherein the scene in the video comprises multiple consecutive frames of video data.

8. The method according to claim 1, wherein the adjustment curve is calculated as the negative of the derivative of $$f(x) = ae^{-\frac{(x-b)^2}{2c^2}},$$

wherein $x$ comprises an input pixel value, $a$ comprises a change in brightness requested based on user preferences, $b$ comprises the mean and $c$ comprises the *min(max−mean, mean−min)* luminance values in an image, a frame of video data or a scene in a video, wherein the scene in the video comprises multiple consecutive frames of video data.

9. The method according to claim 1, wherein the method further comprises:
   sending the resulting mapping curve to a display for rendering the final image based on the resulting mapping curve.

10. A display management unit, DMU, comprising a processor that, upon receiving a set of input image data, processes an original luminance or chrominance mapping curve according to:
    calculating an original luminance mapping or chrominance mapping curve from the set of input image data;
    receiving an adjustment curve, the adjustment curve being based upon a scaling factor representing an ambient illumination of a viewing environment and/or user preferences; and
    applying the adjustment curve to the original mapping curve to produce a resulting curve for rendering a final image based on the resulting curve, wherein the adjustment curve is calculated as:

$f_s(x)$=some Saturation Scale Function $$C'_T = C_T \times f_S(I)$$

$$C'_P = C_P \times f_S(I)$$

wherein $C_T$ and $C_P$ are chroma components of a source image, and $C'_T$ and $C'_P$ are chroma components of a target image and $I$ is a luminance component, wherein optionally the Saturation Scale Function may be a function of one of ambient conditions and the user preferences.

11. The DMU according to claim 10, wherein the user preferences comprise user preferences regarding one of saturation, brightness and contrast of the final image.

12. The DMU according to claim 11, wherein applying the adjustment curve to the original curve comprises applying an operation to the original curve employing the adjustment curve, wherein optionally the operation comprises one of addition, subtraction, multiplying, dividing and convolving.

13. The DMU according to claim 10, wherein the DMU sends the resulting curve to a display for rendering a final image based on the resulting curve.

* * * * *